(12) United States Patent
Won et al.

(10) Patent No.: US 9,823,409 B2
(45) Date of Patent: Nov. 21, 2017

(54) PHOTOLUMINESCENT LAYERED COMPOSITE, BACKLIGHT UNIT, AND DISPLAY DEVICE INCLUDING THE COMPOSITE

(71) Applicant: SAMSUNG ELECTRONICS CO., LTD., Suwon-si, Gyeonggi-do (KR)

(72) Inventors: Nayoun Won, Suwon-si (KR); Hyun A Kang, Suwon-si (KR); Yongwook Kim, Hwaseong-si (KR); Eun Joo Jang, Suwon-si (KR); Oul Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 269 days.

(21) Appl. No.: 14/834,543

(22) Filed: Aug. 25, 2015

(65) Prior Publication Data

US 2016/0062021 A1    Mar. 3, 2016

(30) Foreign Application Priority Data

Aug. 26, 2014   (KR) ................ 10-2014-0111705

(51) Int. Cl.
*F21V 7/04* (2006.01)
*F21V 8/00* (2006.01)
*B82Y 20/00* (2011.01)

(52) U.S. Cl.
CPC ............. *G02B 6/005* (2013.01); *B82Y 20/00* (2013.01)

(58) Field of Classification Search
CPC ...... B82Y 20/00; G02B 6/0001; G02B 6/005; G02B 6/0003
See application file for complete search history.

(56) References Cited

U.S. PATENT DOCUMENTS

| | | | |
|---|---|---|---|
| 5,593,615 | A | 1/1997 | Nerad et al. |
| 6,623,129 | B2 | 9/2003 | Fujimori |
| 7,445,348 | B2 | 11/2008 | Shimada et al. |
| 7,683,109 | B2 | 3/2010 | Yoshida et al. |
| 7,903,204 | B2 | 3/2011 | Son et al. |
| 8,035,952 | B2 | 10/2011 | Yoshida et al. |

(Continued)

FOREIGN PATENT DOCUMENTS

| | | |
|---|---|---|
| CN | 1791810 A | 6/2006 |
| KR | 1020080009401 A | 1/2008 |

(Continued)

OTHER PUBLICATIONS

Coe-Sullivan et al., "Quantum Dots for LED Downconversion in DIsplay Applications", ECS Journal of Solid State Science and Technology, 2(2), 2013, pp. R3026-R3030.

(Continued)

*Primary Examiner* — Ali Alavi
(74) *Attorney, Agent, or Firm* — Cantor Colburn LLP (57) ABSTRACT

A photoluminescent layered composite includes: a light conversion layer including a first polymer matrix and a plurality of semiconductor nanocrystals dispersed in the first polymer matrix; and a metal oxide layer, wherein the metal oxide layer includes a plurality of conductive metal oxide particles, and wherein the metal oxide layer is disposed on at least one surface of the light conversion layer. Also a backlight unit and a display device include the same.

23 Claims, 3 Drawing Sheets

(56) References Cited

U.S. PATENT DOCUMENTS

| | | |
|---|---|---|
| 2003/0017264 A1* | 1/2003 | Treadway .............. C09K 11/08 427/212 |
| 2007/0289480 A1 | 12/2007 | Yang et al. |
| 2008/0014373 A1 | 1/2008 | Muramatsu et al. |
| 2008/0178924 A1* | 7/2008 | Kempa ................. B82Y 10/00 136/244 |
| 2009/0007956 A1* | 1/2009 | Kempa ........... H01L 31/022425 136/244 |
| 2009/0161035 A1 | 6/2009 | Shao et al. |
| 2012/0001217 A1 | 1/2012 | Kang et al. |
| 2012/0113672 A1 | 5/2012 | Dubrow et al. |
| 2013/0148057 A1 | 6/2013 | Kang et al. |
| 2013/0148330 A1 | 6/2013 | Kim et al. |
| 2013/0169904 A1 | 7/2013 | Kang et al. |
| 2013/0265522 A1 | 10/2013 | Jung et al. |
| 2014/0036203 A1 | 2/2014 | Guillou et al. |
| 2014/0036536 A1 | 2/2014 | Gettemy et al. |

FOREIGN PATENT DOCUMENTS

| | | |
|---|---|---|
| KR | 1020080097773 A | 11/2008 |
| KR | 1020100131131 A | 12/2010 |
| KR | 10-1028090 B1 | 4/2011 |
| KR | 1020110078547 A | 7/2011 |
| KR | 10-1156096 B1 | 6/2012 |
| KR | 1020130065608 A | 6/2013 |
| KR | 1020130066306 A | 6/2013 |
| KR | 1020130077576 A | 7/2013 |
| KR | 1020130112990 A | 10/2013 |
| KR | 1020130137308 A | 12/2013 |

OTHER PUBLICATIONS

Erdem et al., "Color Science of nanocrystal quantum dots for lighing and displays", Nanophotonics, 2013.

Luo et al., "Quantum dots: a new era for liquid crystal display backlight", SPIE, 2014, pp. 1-3.

* cited by examiner

PHOTOLUMINESCENT LAYERED COMPOSITE, BACKLIGHT UNIT, AND DISPLAY DEVICE INCLUDING THE COMPOSITE

CROSS REFERENCE TO RELATED APPLICATION

This application claims priority to and the benefit of Korean Patent Application No. 10-2014-0111705, filed in the Korean Intellectual Property Office on Aug. 26, 2014, and all the benefits accruing therefrom under 35 U.S.C. §119, the entire content of which in its entirety is incorporated herein by reference.

BACKGROUND

1. Field

A photoluminescent layered composite, a backlight unit, and a display device including the composite are disclosed.

2. Description of the Related Art

Liquid crystal display ("LCD") devices form an image with external light, unlike plasma display panels ("PDPs") and field emission displays ("FEDs"), which form an image using self-emitting light. The light for LCD devices is provided by a backlight unit on the rear side. As for the backlight unit for an LCD device, a cold cathode fluorescent lamp ("CCFL") has been used as a light source. However, the CCFL used as a light source does not provide uniform luminance and a color purity of the CCFL deteriorates when the LCD device has a larger screen. As a result, a backlight unit using three-color LEDs as a light source has been recently developed. Since the backlight unit using the three color LEDs as the light source produces improved color purity, as compared to the backlight unit using the CCFL, it is used in a high quality display devices. However, the backlight unit using three color LEDs as a light source costs more than the backlight unit using the CCFL as a light source. To mitigate this problem, a white LED that emits light by converting light output from a single color LED chip to white light has been proposed. However, although the white LED is not as expensive as the three-color LEDs, color purity and color reproducibility of the white LED are less than a color purity and color reproducibility of an LCD device including the three-color LEDs. Accordingly, various attempts to develop a quantum dot-containing light conversion layer material, and a backlight unit and a display device including the same and having improved cost competitiveness as well as improving color purity and color reproducibility, have been made.

SUMMARY

An embodiment provides a photoluminescent layered composite including a light conversion layer including quantum dots and improved performance of the light conversion layer.

Another embodiment provides a backlight unit including the photoluminescent layered composite.

Yet another embodiment provides a display device including the photoluminescent layered composite.

In an embodiment, a photoluminescent layered composite includes: a light conversion layer including a first polymer matrix and a plurality of semiconductor nanocrystals dispersed in the first polymer matrix; and a metal oxide layer, wherein the metal oxide layer includes a plurality of conductive metal oxide particles, and wherein the metal oxide layer is disposed on at least one surface of the light conversion layer.

The first polymer matrix may include a thiol-ene resin, a (meth)acrylate-based polymer, a urethane-based resin, an epoxy resin, a vinyl-based polymer, a silicone, or a combination thereof.

The semiconductor nanocrystal may include a Group II-VI compound, a Group II-V compound, a Group IV-VI compound, a Group IV compound, or a combination thereof.

The metal oxide layer may include a particle layer including a plurality of conductive metal oxide particles.

The metal oxide layer may include a second polymer matrix and a plurality of conductive metal oxide particles dispersed in the second polymer matrix.

The second polymer matrix may include a thiol-ene resin, a (meth)acryl-based polymer, a urethane-based polymer, an epoxy resin, a polyester, a polyamide, a vinyl-based polymer, or a combination thereof.

The metal oxide layer may include metal oxide particles including ZnO, $Al_2O_3$, $TiO_2$, $CeO_2$, $Sb_2O_5$, $SnO_2$, $In_2O_3$, Al-doped ZnO, Ga-doped ZnO, Sn-doped $In_2O_3$, In-doped $SnO_2$, Sb-doped $SnO_2$, or combination thereof.

The metal oxide layer may have sheet resistance of about $10^3$ to about $10^{13}$ ohms per square ($\Omega$/sq).

The metal oxide layer may be an antistatic layer.

The conductive metal oxide particles may have an average particle diameter of about 0.005 m to about 10 micrometers ($\mu$m).

The conductive metal oxide particles may have a spherical shape, a rod shape, a multipod shape, a whisker shape, or a combination thereof.

The metal oxide layer may have light transmittance of about 90% or greater in a wavelength region of 380 nm to 760 nm.

In another embodiment, a backlight unit includes:
a light source; and
a photoluminescent layered composite including a light conversion layer including a first polymer matrix and a plurality of semiconductor nanocrystals dispersed in the polymer matrix, and a metal oxide layer disposed on at least one surface of the light conversion layer, wherein the photoluminescent layered composite is effective for converting incident light from the light source to liquid crystal panel, and wherein the photoluminescent layered composite is spaced apart from the light source,
wherein the metal oxide layer includes a plurality of conductive metal oxide particles, and wherein the metal oxide layer is attached to at least one surface of the light conversion layer.

The backlight unit may include a light guide panel positioned between the light source and the layered composite, and the photoluminescent layered composite may be disposed while the surface of the metal oxide layer faces the light guide panel.

The metal oxide layer may be a particle layer formed of a plurality of conductive metal oxide particles.

The metal oxide layer may include a second polymer matrix and a plurality of metal oxide particles dispersed in the second polymer matrix.

The second polymer matrix may include a thiol-ene resin, a (meth)acryl-based polymer, a urethane-based resin, an epoxy resin, a polyester, a polyamide, a vinyl-based polymer, or a combination thereof.

The metal oxide layer may include metal oxide particles including ZnO, $Al_2O_3$, $TiO_2$, $CeO_2$, $Sb_2O_5$, $SnO_2$, $In_2O_3$, Al-doped ZnO, Ga-doped ZnO, Sn-doped $In_2O_3$, In-doped $SnO_2$, Sb-doped $SnO_2$, or combination thereof.

The metal oxide layer may have sheet resistance of about $10^3$ to about $10^{13}$ Ω/sq.

Also disclosed is a display device including the photoluminescent layered composite.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well-known technologies are not specifically explained to avoid ambiguous understanding of the present invention. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, "(meth)acrylate" refers to acrylate and/or methacrylate.

"Alkane" means a straight or branched chain saturated hydrocarbon.

"Alkene" means a straight or branched chain hydrocarbon having at least one carbon-carbon double bond.

"Alkyne" means a straight or branched chain hydrocarbon having at least one carbon-carbon triple bond.

"Alkyl" as used herein means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC═$CH_2$)).

"Aryl" means a monovalent group formed by the removal of one hydrogen atom from one or more rings of an arene (e.g., phenyl or napthyl).

Figure 1:
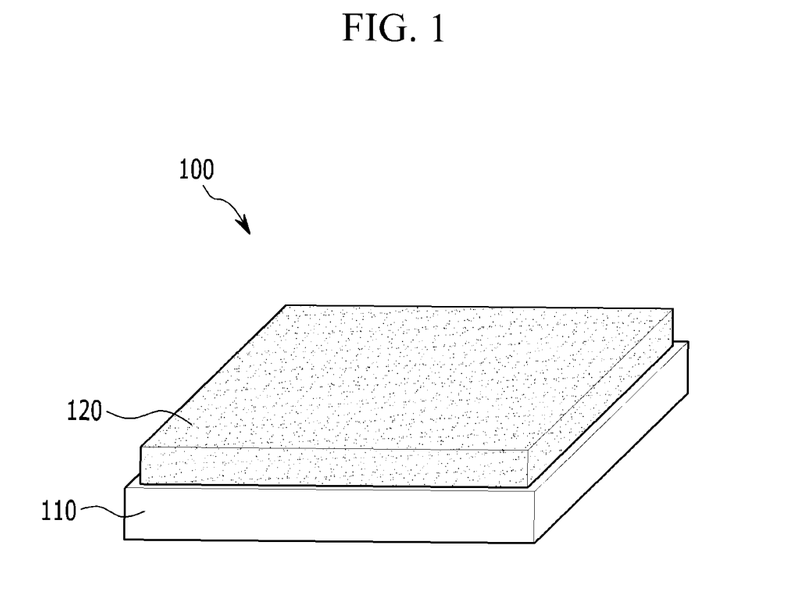
FIG. 1 is a schematic side view of an embodiment of a layered composite.

In an embodiment, as shown in FIG. 1, a photoluminescent layered composite 100 includes a light conversion layer 110 including a first polymer matrix and a plurality of semiconductor nanocrystals dispersed in the first polymer matrix, and a metal oxide layer 120. The metal oxide layer 120 includes a plurality of conductive metal oxide particles. The metal oxide layer 120 may be disposed on at least one surface of the light conversion layer (see FIG. 1).

The first polymer matrix may include a thiol-ene resin, a (meth)acrylate-based polymer, a urethane-based polymer, an epoxy resin, a silicone, a vinyl-based polymer, or a combination thereof. As used herein, "thiol-ene resin" refers to a polymerization product of a mixture of a first monomer having at least two thiol (—SH) groups at an end thereof and a second monomer having at least two carbon-carbon unsaturated bonds at an end thereof. The thiol-ene resin is further described in in U.S. Patent Publication No. 2012-0001217, the content of which is incorporated herein in its entirety by reference.

The (meth)acrylate-based polymer includes a polymer of at least one (meth)acryl-based monomer, at least one (meth)acryl-based oligomer, or a combination thereof.

Examples of the (meth)acrylic monomer may include isobornyl(meth)acrylate, lauryl(meth)acrylate, benzoyl (meth)acrylate, norbornyl(meth)acrylate, cyclohexyl(meth) acrylate, n-hexyl(meth)acrylate, iso-octyl(meth)acrylate, butyl(meth)acrylate, adamantyl acrylate, cyclopentyl acrylate, ethyleneglycol dimethacrylate, hexanediol diacrylate, tricyclodecanedimethanol diacrylate, and trimethylolpropane triacrylate, but are limited thereto.

Specific examples of the (meth)acryl-based oligomer include urethane(meth)acrylate, epoxy(meth)acrylate, polyester(meth)acrylate, acryl(meth)acrylate, polybutadiene (meth)acrylate, silicone(meth)acrylate and melamine(meth) acrylate, but are not limited thereto. The polymerizable oligomer may have a molecular weight of about 1000 to about 20,000 g/mol, or about 2000 to about 10,000 g/mol, but is not limited thereto. Such polymerizable oligomer may be synthesized by any suitable method, and many are commercially available.

Specific examples of the epoxy resin and silicone include commercially available resins, and the epoxy resin and the silicone are not particularly limited, and any suitable epoxy resin or silicone may be used.

Specific examples of the vinyl-based polymer include polystyrene, polyvinylpyrrolidone, polyvinylchloride, and polyvinyl alcohol, but are not limited thereto.

The light conversion layer includes a plurality of semiconductor nanocrystals dispersed in the first polymer matrix. The semiconductor nanocrystals may include a Group II-VI compound, a Group III-V compound, a Group IV-VI compound, a Group IV compound, or a combination thereof.

The Group II-VI compound may comprise a binary element compound comprising CdSe, CdTe, ZnS, ZnSe, ZnTe, ZnO, HgS, HgSe, HgTe, MgSe, MgS, or combination thereof; a ternary element compound comprising CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof; or a quaternary element compound comprising HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof. The Group III-V compound semiconductor may comprise a binary element compound comprising GaN, GaP, GaAs, GaSb, AlN, AlP, AlAs, AlSb, InN, InP, InAs, InSb, or a combination thereof; a ternary element compound comprising GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof; or a quaternary element compound comprising GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof. The Group IV-VI compound may be a binary element compound comprising SnS, SnSe, SnTe, PbS, PbSe, PbTe, or a combination thereof; a ternary element compound comprising SnSeS, SnSeTe, SnSTe, PbSeS, PbSeTe, PbSTe, SnPbS, SnPbSe, SnPbTe, or a combination thereof; or a quaternary element compound comprising SnPbSSe, SnPbSeTe, SnPbSTe, or a combination thereof. The Group IV compound may comprise a singular element compound comprising Si, Ge, or a combination thereof; or a binary element compound comprising SiC, SiGe, or a combination thereof. A combination comprising at least one of the foregoing may be used.

The binary element compound, the ternary element compound, or the quaternary element compound may be present and have a uniform concentration in a particle, or may be present with a locally different concentration in a single particle e.g., to provide a gradient of the compound. The semiconductor nanocrystal may have a core-shell structure wherein a semiconductor nanocrystal surrounds another (e.g., different) semiconductor nanocrystal. The interface of the core and the shell may have a concentration gradient wherein the concentration of the element(s) of the shell decrease in the direction towards the core. The semiconductor nanocrystal may have a single core of a semiconductor nanocrystal and multiple shells surrounding the core. The multi-layered shell structure may have at least two shells wherein each shell may have a single composition, an alloy, or have a concentration gradient.

In the semiconductor nanocrystal, the material of the shell may have a larger energy band gap than that of the core, and thereby the semiconductor nanocrystal may provide a quantum confinement effect more effectively. In case of a multi-shell type semiconductor nanocrystal particle, the band gap of the material of an outer shell may be higher energy than that of the material of an inner shell (i.e., a shell that is closer to the core). In this case, the semiconductor nanocrystal may emit light of a wavelength ranging from UV to infrared light.

The semiconductor nanocrystal may have quantum efficiency of greater than or equal to about 50 percent (%), greater than or equal to about 70%, or greater than or equal to about 90%, or about 50% to about 99.9%, or about 60% to about 99%. Within such ranges, it becomes possible to enhance the luminescence efficiency of the device. The semiconductor nanocrystal absorbs blue light and then emits green light in a wavelength of about 520 to about 550 nanometers (nm) or red light in a wavelength of about 590 to about 650 nm.

The semiconductor nanocrystal may have a narrower full width at half maximum (FWHM) so as to provide enhanced color purity or color reproducibility. The semiconductor nanocrystal may have a FWHM of less than or equal to about 45 nm, for example less than or equal to about 40 nm, or less than or equal to about 30 nm, or 5 nm to about 45 nm, or about 10 nm to about 40 nm.

The semiconductor nanocrystal may have a particle diameter (e.g., a longest diameter in the case of a non-spherical particle) ranging from about 1 nm to about 100 nm. For example, the semiconductor nanocrystal may have a particle diameter (the longest diameter in case of a non-spherical particle) ranging from about 1 nm to about 20 nm.

The shape of the semiconductor nanocrystal is not particularly limited. For example, the semiconductor nanocrystal may have a spherical shape, a pyramidal shape, or a multi-arm shape, or may be a cubic nanoparticle, a nanotube, a nanowire, a nanofiber, or a nanosheet-shaped particle. A combination of shapes may be used.

The semiconductor nanocrystal may be prepared by any suitable method. For example, the semiconductor nanocrystal may be prepared by a wet method (e.g., a wet chemical process) described herein below, but it is not limited thereto. In the wet chemical method, precursor materials react in an organic solvent to grow nanocrystal particles, and the organic solvent or a ligand compound may naturally coordinate the surface of the semiconductor nanocrystal, controlling the growth of the nanocrystal. As the organic solvent coordinated on the surface of the semiconductor nanocrystal may affect the stability of the device, additional organic materials on the surface of the nanocrystal may be removed by adding the nanocrystal to an excess amount of a non-solvent and centrifuging the resulting mixture. Examples of the non-solvent may include, but are not limited to, acetone, ethanol, and methanol. A combination of solvents may be used. After the removal of extra organic material, the amount of the organic materials coordinated on the surface of the nanocrystal may be less than or equal to about 35% by weight, based on the total weight of the nanocrystal. The organic materials may include a ligand compound, an organic solvent, or a combination thereof. The ligand compound may be any organic compound that may be used as a ligand compound in the wet chemical method, and the types thereof are not particularly limited. For example, the ligand compound may comprise compounds of the formulas RCOOH, RNH$_2$, R$_2$NH, R$_3$N, RSH, R$_3$PO, R$_3$P, ROH, RCOOR', RPO(OH)$_2$, R$_2$POOH, or a combination thereof, wherein R and R' are each independently a C1 to C24 alkyl group, a C2 to C24 alkenyl group, or a C5 to C24 aryl group. The organic ligand compound may be coordinated to the surface of the nanocrystals as prepared, enhancing disbursement of the nanocrystals in a solution, and affecting the light-emitting and electrical characteristics of the nanocrystals. Specific examples of the organic ligand compound may include, but are not limited to, thiols such as methanethiol, ethanethiol, propanethiol, butanethiol, pentanethiol, hexanethiol, octanethiol, dodecanethiol, hexadecanethiol, octadecanethiol, and benzylthiol; amines such as methylamine, ethylamine, propylamine, butylamine, pentylamine, hexylamine, octylamine, dodecylamine, hexadecylamine, octadecylamine, dimethylamine, diethylamine, and dipropylamine; acids such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; phosphines such as methylphosphine, ethylphosphine, propylphosphine, butylphosphine, and pentylphosphine; a phosphine compound or an oxide compound thereof such as methylphosphine oxide, ethylphosphine oxide, propylphosphine oxide, and butylphosphine oxide; diphenylphosphine, a triphenylphosphine compound or an oxide compound thereof; and phosphonic acid. A combination comprising at least one of the foregoing may be used. The organic ligand compound may be used alone or as a mixture of two or more compounds.

The solvent may be any of those disclosed for the wet chemical method, and the types thereof are not particularly limited. For example, the solvent may comprise, but is not limited to, a C6 to C22 primary amine such as hexadecylamine; a C6 to C22 secondary amine such as dioctylamine; a C6 to C40 tertiary amine such as trioctylamine; a nitrogen-containing heterocyclic compound such as pyridine; a C6 to C40 aliphatic hydrocarbon (e.g., alkane, alkene, alkyne, and the like) such as hexadecane, octadecane, octadecene, and squalane; a C6 to C40 aromatic hydrocarbon such as phenyl dodecane, phenyl tetradecane, and phenyl hexadecane; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether and benzyl ether; or a combination additional polymer layer thereof.

The light conversion layer may be prepared by mixing the semiconductor nanocrystal and the monomer or oligomer for the first polymer matrix, and performing a polymerization reaction, without limitation.

The light conversion layer may have a multi-layer structure. For example, the light conversion layer may further include a first additional polymer layer and/or a barrier layer 210 and optionally a second additional polymer layer and/or a barrier layer 230 disposed on opposite sides of a quantum dot-containing polymer matrix 220 (see FIG. 2). In another embodiment the light conversion layer may further optionally include the first additional polymer layer and/or a barrier layer 210 and includes the second additional polymer layer and/or a barrier layer 230 disposed on opposite sides of the quantum dot-containing polymer matrix 220. The first and the second additional polymer layers may each independently include a protective film, for example, a barrier film that blocks oxygen and/or moisture and protects the semiconductor nanocrystal. The first and the second additional polymer layer or the barrier film may each independently include, but are not limited to, a polyester such as polyethyleneterephthalate, polybutyleneterephthalate, and polyethylenenaphthalate, a polycarbonate, a polyolefin such as polyethylene and polypropylene, a vinyl-based polymer such as polyvinylacetate and polystyrene, a cyclic olefin polymer (COP), a polyimide, a thiol-ene resin, or a combination thereof. As used herein, the cyclic olefin polymer may be a polymer produced by polymerization of a cyclic olefin monomer that is prepared by reacting a cyclic diene compound such as cyclopentene, norbornene, or tetracyclododecene with a linear olefin monomer such as ethylene, propylene, and butylene. A barrier layer including silica (e.g., SiOx, such as $SiO_2$), titania, and/or alumina may be formed by, for example, sputtering on the light conversion layer, the additional polymer layer, or the barrier film.

Figure 2:
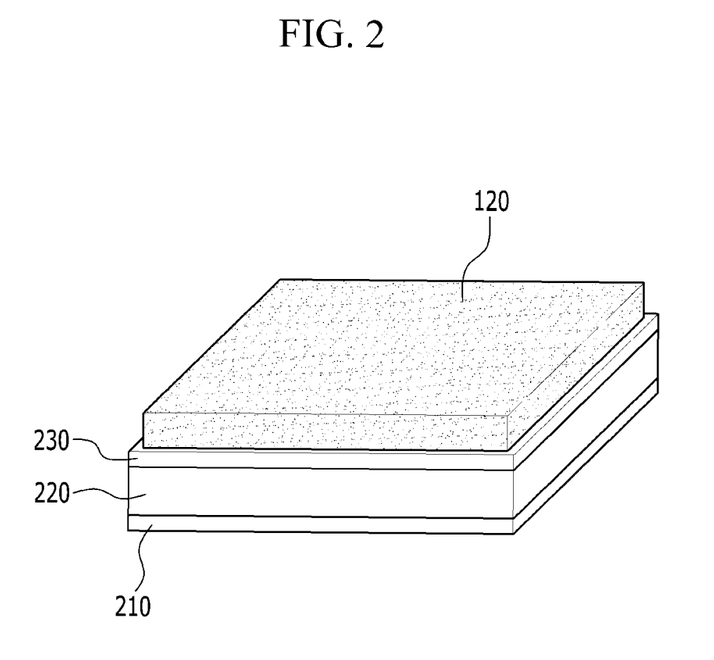
FIG. 2 is a schematic side view of another embodiment of a layered composite.

The photoluminescent layered composite according to an embodiment includes a metal oxide layer 120 layered on one surface or both surfaces of the light conversion layer 110. When the light conversion layer is a multi-layer structure including a protective film (e.g., a barrier film including a barrier layer), the metal oxide layer 120 may be formed on the opposite surface of the barrier layer 230. The metal oxide layer 120 includes a plurality of conductive oxide particles. The conductive metal oxide particles may include ZnO, $Al_2O_3$, $TiO_2$, $CeO_2$, $Sb_2O_5$, $SnO_2$, $In_2O_3$, Al-doped ZnO, Ga-doped ZnO, Sn-doped $In_2O_3$, In-doped $SnO_2$, and Sb-doped $SnO_2$, or combination thereof.

In an embodiment, the metal oxide layer including a plurality of conductive oxide particles may solve a problem of static electricity and non-uniform light extraction during a manufacture process of a device.

A light conversion sheet including a semiconductor nanocrystal as a light emitting material may be included as a constituent element of a backlight unit used in a display device. In this backlight unit, a member of an optical sheet such as a prism sheet and a diffuser sheet, a diffusion plate, or a reflection sheet may be stacked on or beneath the quantum dot sheet to efficiently transfer light emitted from a light source to a display panel. When these members are stacked, static electricity may be easily generated and thus lead to adhesion of a contamination material such as dust and deteriorate display quality of a display device (e.g., an LCD) as well as directly damage the display device.

In general, the quantum dot sheet comprises a polymer having almost no polarity, such as an epoxy resin or a (meth)acrylic acid resin, as a host matrix and a film having low polarity as a substrate film or a barrier film.

Accordingly, this quantum dot sheet has very high sheet resistance and may cause significant static electricity during assembly of a backlight unit and it is difficult to be uniformly attached to a light guide panel. The non-uniform attachment of the quantum dot sheet to the light guide panel may consequently cause non-uniform light extraction.

The generation of the static electricity may be suppressed by coating a conductive polymer or a surfactant onto a film or manufacturing the film by including them as a component. However, the film or the coating including the conductive polymer may express a particular color (e.g., blue) and thus may reduce the luminance and change a color coordinate when used with the quantum dot sheet. In addition, the surfactant may have an influence on transparency of the film and also easily adsorb water and thus cause a serious risk to stability of a quantum dot.

On the contrary, a photoluminescent composite sheet according to an embodiment may solve the problems of the static electricity and non-uniform light extraction without the side effect. The photoluminescent composite sheet includes a metal oxide layer including a plurality of conductive metal oxide particles on a light conversion layer, and thus may show reduced sheet resistance (or improved electrical conductivity). For example, the metal oxide layer may have sheet resistance of about $10^3$ to about $10^{13}$ ohms per square ($\Omega$/sq).

Accordingly, the photoluminescent composite sheet may not include the conductive polymer and/or the surfactant, and may provide excellent antistatic characteristics. In addition, the photoluminescent composite sheet having the disclosed structure may prevent non-uniform adhesion of other constituent elements such as a light guide panel in a backlight unit. Furthermore, the metal oxide layer included in the photoluminescent-layered composite may maintain or improve a color coordinate and luminance of the light conversion layer, unlike the conductive polymer or the surfactant included in the photoluminescent composite sheet. The amount of the conductive metal oxide particles included in the metal oxide layer may be selected so that the metal oxide layer may have sheet resistance within the disclosed range. For example, the metal oxide layer may include about 0.005 to about 10 wt %, about 0.01 to about 5 wt %, or about 0.1 to about 1 wt %, of a plurality of metal oxide particles based on the weight of the polymer resin, without limitation.

In an embodiment, the metal oxide layer may be a particle layer comprising a plurality of conductive metal oxide particles. In an embodiment, the particle layer does not include an organic host matrix (e.g., a polymer matrix). In a non-limiting example, the particle layer may be formed by dispersing a plurality of conductive metal oxide particles in a solvent, coating the dispersion on the surface of the light conversion layer, and removing the solvent. When the metal oxide layer is the particle layer, much lower sheet resistance may be obtained.

Alternatively, the metal oxide layer may include a second polymer matrix and a plurality of conductive metal oxide particles dispersed in the second polymer matrix. The second polymer matrix may include a transparent polymer. The second polymer matrix may include a thiol-ene resin, a (meth)acrylate-based polymer, a urethane-based polymer, an epoxy resin, a silicone, a vinyl-based polymer, or a combination thereof. Details of the resin are the same as described above, and thus are not repeated for clarity.

The thickness of the metal oxide layer is not particularly limited, and may be appropriately selected considering light transmittance and sheet resistance characteristics. For example, the metal oxide layer may have a thickness of greater than or equal to about 5 nm and less than or equal to about 50 μm, or about 10 nm to about 50 μm, or about 100 nm to about 1 μm, without limitation.

The conductive metal oxide particle may have an average particle diameter of greater than or equal to about 0.005 μm, for example, greater than or equal to about 0.05 μm, greater than or equal to about 0.1 μm, greater than or equal to about 0.11 μm, or greater than or equal to about 0.5 μm, or 0.005 micrometer to about 100 μm, or about 0.01 μm to about 10 μm. The conductive metal oxide particle may have an average particle diameter of less than or equal to about 10 μm, for example, less than or equal to about 9 μm, less than or equal to about 8 μm, less than or equal to about 7 μm, less than or equal to about 6 μm, or less than or equal to about 5 μm.

The conductive metal oxide particle may have any suitable shape. The conductive metal oxide particle may have a spherical shape, a rod shape, a multipod shape, a whisker shape, or a combination thereof.

The metal oxide layer may have light transmittance of about 90% or greater in a wavelength region of 380 to 760 nm.

The metal oxide layer may be formed on the light conversion layer using any suitable method. For example, the metal oxide layer may be formed by deposition, casting, sputtering, spray coating, printing, and the like, without limitation.

In another embodiment, a backlight unit includes a light source and the photoluminescent layered composite.

The light source may be an LED light source including a plurality of LED chips emitting light having predetermined wavelengths. The LED light source may be a blue light-emitting LED light source or an ultraviolet (UV)-emitting LED light source. The photoluminescent layered composite is spaced apart from the light source at a predetermined distance and converts light emitted from the light source to, for example, white light and provide the light toward the liquid crystal panel. Details of the photoluminescent layered composite are the same as described above.

The backlight unit may include a light guide panel (LGP) between the light source and the layered composite. A reflector (not shown) may be provided under the light guide panel. The backlight unit may further include an optical sheet ((such as a prism sheet, a micro-lens sheet, a brightness enhancement film) on the light guide panel, and the photoluminescent layered composite may be positioned between the light guide panel and optical sheets The photoluminescent layered composite may be disposed while the surface of the metal oxide layer faces the light guide panel or the diffusion plate (when being present). As described above, the photoluminescent layered composite may have reduced non-uniform contact with the light guide panel and the like and enables uniform light extraction.

When the light emitted from the light source passes photoluminescent composite, blue light, green light, and red light are mixed, obtaining white light. Herein, when the semiconductor nanocrystal included in the photoluminescent composite is included by changing concentrations and ratios, blue light, green light, and red light may be adjusted in a desired ratio. The white light may have improved color reproducibility and color purity.

In the photoluminescent composite, the light conversion layer includes a plurality of layers (e.g., a red light emitting light conversion layer and a green light emitting light conversion layer).

An optical film such as a diffusion plate, a prism sheet, a microlens sheet, and a luminance improvement film may be provided on the photoluminescent composite layer, as needed.

The backlight unit may be desirably used for a display, for example a liquid crystal display. A cross-section of a liquid crystal display including the backlight unit is schematically shown in FIG. 3.

Figure 3:
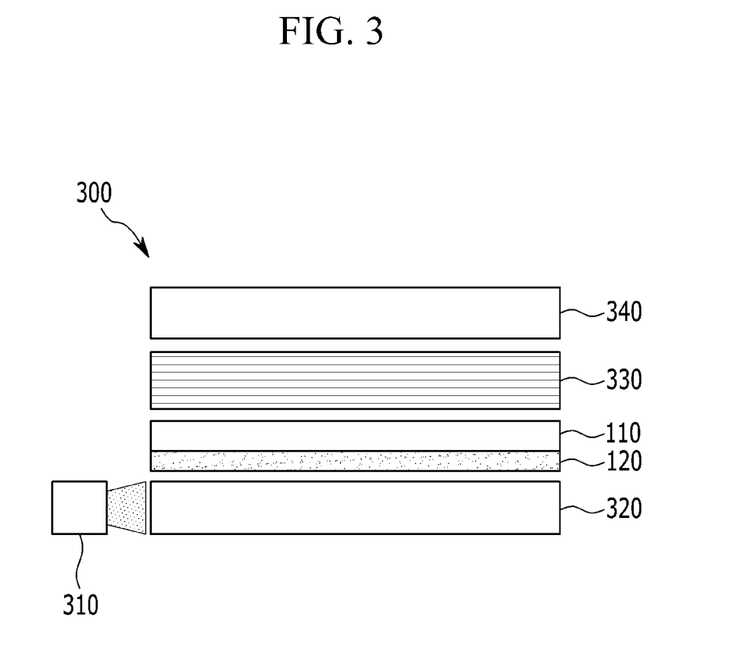
FIG. 3 is a schematic cross-sectional view of an embodiment of a liquid crystal display including an embodiment of a layered composite

Referring to FIG. 3, a liquid crystal display 300 includes a backlight unit including a light source 310, a light guide panel 320, the photoluminescent layered composite and optical sheet comprising the metal oxide layer 120, the light conversion layer 110, and an optical sheet 330, and a liquid crystal display panel 340 disposed on the backlight unit. The liquid crystal panel generates an image with a predetermined color using white light from the backlight unit. The liquid crystal panel may include a first polarizer, a liquid crystal layer, a color filter, and the like. The liquid crystal panel is not particularly limited, and may include a commercially available liquid crystal panel, for example.

Hereinafter, the embodiments are illustrated in more detail with reference to examples. However, the following exemplary embodiments are only for further illustration, and the scope of the present disclosure shall not be limited thereto.

EXAMPLES

Reference Example 1

Preparation of Bare Semiconductor Nanocrystal (1) 0.2 millimole (mmol) of indium acetate, 0.6 mmol of palmitic acid, and 10 mL of 1-octadecene are put in a reactor and heated at 120° C. under vacuum. One hour later, the atmosphere in the reactor is converted to nitrogen. After heating the reactor at 280° C., a mixed solution of 0.1 mmol of tris(trimethylsilyl)phosphine (TMS3P) and 0.5 mL of trioctylphosphine are rapidly injected thereinto, and the mixture is reacted for 20 minutes. The resultant is rapidly cooled to room temperature, and a precipitate is obtained by adding acetone thereto and centrifuging the mixture, and is then dispersed in toluene. The obtained InP semiconductor nanocrystal shows a UV first absorption maximum wavelength ranging from 420 to 600 nm.

Further, 0.3 mmoL (0.056 grams, g) of zinc acetate, 0.6 mmol (0.189 g) of oleic acid, and 10 mL of trioctylamine are put in a reaction flask and vacuum-treated at 120° C. for 10 minutes. Then, $N_2$ is substituted for the atmosphere of the reaction flask, and the flask is heated to 220° C. The InP semiconductor nanocrystal (optical density (OD):0.15) toluene dispersion and 0.6 mmol of S/TOP are added to the reaction flask, and the mixture is heated to 280° C. and reacted for 30 minutes. When the reaction is complete, the reaction solution is rapidly cooled to room temperature, obtaining a reactant including InP/ZnS semiconductor nanocrystal.

(2) An excess amount of ethanol is added to the reaction mixture including InP/ZnS semiconductor nanocrystal, and the mixture is centrifuged to remove an extra organic material in the solution. After the centrifugation, a supernatant is discarded, the centrifuged precipitate is dried and dispersed into toluene, and then its UV-vis absorption spectrum and photoluminescent spectrum is measured.

Reference Example 2

Preparation of Composition for Light Conversion Layer 30 wt % of lauryl methacrylate, 36 wt % of tricyclodecane dimethanol diacrylate, 4 wt % of trimethylol propane triacrylate, 20 wt % of epoxy diacrylate oligomer (Sartomer), 1 wt % of 1-hydroxy-cyclohexyl-phenyl-ketone, and 1 wt % of 2,4,6-trimethylbenzoyl-diphenyl-phosphineoxide are mixed to prepare a mixture of monomers and oligomers. The mixture is defoamed under vacuum.

Then, a semiconductor nanocrystal is centrifuged once by the same method as in reference example 1. A toluene dispersion obtained by dispersing the semiconductor nanocrystal in toluene [concentration: (absorption at 449 nm)× (volume of a QD solution (mL))=3.75] is mixed with an excess amount of ethanol, and the mixture is centrifuged. The separated semiconductor nanocrystal is dispersed in 0.15 g of lauryl methacrylate (10 wt % of the entire composition except for an initiator), the obtained dispersion is added to the prepared monomer (oligomer) mixture (1.35 g), and the mixture is vortexed, obtaining a semiconductor nanocrystal composition.

Reference Example 3

Preparation of Light Conversion Layer

About 1 g of the semiconductor nanocrystal composition according to Reference Example 2 is drop-cast on a PET film having a barrier layer formed by sputtering of $SiO_x$ on one surface (I-component, hereinafter a barrier film). The composition is covered by barrier film and cured by UV light for 10 seconds (light intensity: 100 milliwatts per square centimeter, $mW/cm^2$), forming a light conversion layer. The light conversion layer is inserted between a light guide panel and an optical sheet of a 60-inch TV equipped with a blue LED having a peak wavelength of 449 nm, and then luminance and color coordinates of the light conversion layer are measured using a spectroradiometer (CS-2000, Konica Minolta) which is placed about 45 cm away from the TV while operating the TV, and the results are provided in Table 2. In addition, the sheet resistance of the light conversion layer is measured by using a high resistance measurement system (MCP-HT450, HIRESTA-UP), and the result is provided in Table 2. Further, the total light transmittance and haze of the barrier film are measured by using a haze meter (Nippon Denshoku, NDH 7000SP), and the results are provided in Table 1.

Example 1

Preparation of Photoluminescent Layered Composite Including Metal Oxide Layer

A dispersion including ZnO nanoparticles (SG-ZnO5SPM, Sukgyung AT, average particle diameter: <10 nm, particle shape: spherical)(dispersion solvent: PGME) is bar-coated to be 20 μm thick on the PET surface of the barrier film (i.e., the opposite surface of the barrier layer) and dried at room temperature for 5 minutes, forming a ZnO nanoparticle layer. Then, a haze meter (NDH 7000SP, Nippon Denshoku) is used to measure the total light transmittance and haze of the manufactured film, and the results are provided in Table 1.

Then, about 1 g of the semiconductor nanocrystal composite according to Reference Example 2 is drop-casted on the barrier layer of the barrier film including the ZnO nanoparticle layer, and the composite is covered by barrier film coated with ZnO nanoparticles and then UV-cured for 10 seconds (light intensity: 100 $mW/cm^2$), obtaining a photoluminescent-layered composite. Then, sheet resistance, luminance, and color coordinates of the photoluminescent-layered composite are measured in the same method as in Reference Example 3, and the results are provided in Table 2.

Comparative Example 1

Preparation of Photoluminescent Layered Composite Including Conductive Polymer Layer A conductive polymer PEDOT:PSS solution (CLEVIOS PH 500) is bar-coated to be about 20 μm thick on the PET surface (i.e., the opposite surface of the barrier layer) of the barrier film and then dried in a 100° C. oven for 5 minutes. Then, a haze meter (NDH 7000SP, Nippon Denshoku) is used to measure the total light transmittance and haze of the film, and the results are provided in Table 1.

Then, 1 g of the semiconductor nanocrystal composite according to Reference Example 2 is drop-casted on the barrier layer of the barrier film coated with the conductive polymer. The composite is covered by the barrier film coated with the conductive polymer and UV-cured for 10 seconds (light intensity: 100 $mW/cm^2$), obtaining a photoluminescent-layered composite. The sheet resistance, luminance, and color coordinates of the photoluminescent-layered composite are measured in the same method as in Reference Example 3, and the results are provided in Table 2.

TABLE 1

|  | Total transmittance (%) | Haze (%) |
| --- | --- | --- |
| Reference Example 3 | 92.0 | 1.0 |
| Comparative Example 1 | 83.8 | 1.0 |
| Example 1 | 91.1 | 1.3 |

Referring to Table 1, the conductive metal oxide layer according to Example 1 maintains high total light transmittance. On the contrary, the conductive polymer layer according to Comparative Example 1 shows sharply deteriorated total light transmittance. In addition, referring to Table 1, the conductive metal oxide layer of Example 1 shows higher haze.

TABLE 2

| | vs. Comparative Example 1 | | | Sheet resistance ($\Omega$/sq) |
|---|---|---|---|---|
| | Lv | $\Delta$Cx | $\Delta$Cy | QD sheet |
| Comparative Example 1 | 100.0% | 0.0000 | 0.0000 | greater than $10^{14}$ |
| Comparative Example 2 | 19.4% | −0.0619 | −0.1262 | $3.0 \times 10^6$ |
| Example 1 | 99.0% | 0.0006 | 0.0016 | $4.4 \times 10^9$ |

Referring to Table 2, the photoluminescent-layered composite according to Example 1 shows remarkably lower sheet resistance (i.e., high electrical conductivity) than the composite according to Reference Example 3, whether shows minimal change in color coordinate and luminance.

On the contrary, the layered composite according to Comparative Example 1 may show low sheet resistance but remarkably changed color coordinates, and particularly, ⅕ of luminance of the composite according to Reference Example 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A photoluminescent layered composite, comprising:
a light conversion layer comprising a first polymer matrix and a plurality of semiconductor nanocrystals dispersed in the first polymer matrix; and
a metal oxide layer,
wherein the metal oxide layer comprises a plurality of conductive metal oxide particles, and
wherein the metal oxide layer is disposed on at least one surface of the light conversion layer.

2. The photoluminescent layered composite of claim 1, wherein the first polymer matrix comprises a thiol-ene resin, a (meth)acrylate polymer, a urethane resin, an epoxy resin, a vinyl polymer, a silicone, or a combination thereof.

3. The photoluminescent layered composite of claim 1, wherein the metal oxide layer is an antistatic layer.

4. The photoluminescent layered composite of claim 1, wherein the semiconductor nanocrystal comprises a Group II-VI compound, a Group III-V compound, a Group IV-VI compound, a Group IV compound, or a combination thereof.

5. The photoluminescent layered composite of claim 1, wherein the metal oxide layer comprises a particle layer comprising a plurality of conductive metal oxide particles.

6. The photoluminescent layered composite of claim 1, wherein the metal oxide layer comprises a second polymer matrix and a plurality of conductive metal oxide particles dispersed in the second polymer matrix.

7. The photo luminescent layered composite of claim 6, wherein the second polymer matrix comprises a thiol-ene resin, a (meth)acryl polymer, a urethane polymer, an epoxy resin, a polyester, a polyamide, a vinyl polymer, or a combination thereof.

8. The photoluminescent layered composite of claim 1, wherein the metal oxide layer comprises metal oxide particles comprising ZnO, $Al_2O_3$, $TiO_2$, $CeO_2$, $Sb_2O_5$, $SnO_2$, $In_2O_3$, Al-doped ZnO, Ga-doped ZnO, Sn-doped $In_2O_3$, In-doped $SnO_2$, Sb-doped $SnO_2$, or a combination thereof.

9. The photoluminescent layered composite of claim 1, wherein the light conversion layer is a multi-layer structure comprising an additional polymer layer, a barrier layer, or both.

10. The photoluminescent layered composite of claim 1, wherein the metal oxide layer has sheet resistance of about $10^3$ to about $10^{13}$ ohms per square.

11. The photoluminescent layered composite of claim 1, wherein the metal oxide particles have an average particle diameter of about 0.005 to about 10 micrometers.

12. The photoluminescent layered composite of claim 1, wherein the conductive metal oxide particles have a spherical shape, a rod shape, a multipod shape, a whisker shape, or a combination thereof.

13. The photoluminescent layered composite of claim 1, wherein the metal oxide layer has light transmittance of about 90 percent or greater for light having a wavelength of 380 to 760 nanometers.

14. A display device comprising the photoluminescent layered composite of claim 1.

15. The display device of claim 14, wherein the device is a liquid crystal display.

16. A backlight unit comprising:
a light source; and
a photoluminescent layered composite comprising
a light conversion layer comprising a first polymer matrix and a plurality of semiconductor nanocrystals dispersed in the polymer matrix, and
a metal oxide layer disposed on at least one surface of the light conversion layer,
wherein the photoluminescent layered composite is spaced apart from the light source and is effective for converting incident light from the light source to liquid crystal panel, and
wherein the metal oxide layer comprises a plurality of conductive metal oxide particles, and
wherein the metal oxide layer is attached to at least one surface of the light conversion layer.

17. The backlight unit of claim 16, wherein the metal oxide layer comprises a second polymer matrix and a plurality of metal oxide particles disposed in the second polymer matrix.

18. The backlight unit of claim 17, wherein the second polymer matrix comprises a thiol-ene resin, a (meth)acryl polymer, a urethane resin, an epoxy resin, a polyester, a polyamide, a vinyl polymer, or a combination thereof.

19. The backlight unit of claim 16, wherein the metal oxide layer comprises metal oxide particles comprising ZnO, $Al_2O_3$, $TiO_2$, $CeO_2$, $Sb_2O_5$, $SnO_2$, $In_2O_3$, Al-doped ZnO, Ga-doped ZnO, Sn-doped $In_2O_3$, In-doped $SnO_2$, Sb-doped $SnO_2$, or a combination thereof.

20. The backlight unit of claim 16, wherein the metal oxide layer has sheet resistance of about $10^3$ to about $10^{13}$ ohms per square.

21. The backlight unit of claim 16, wherein the metal oxide layer is an antistatic layer.

22. The backlight unit of claim 16, wherein the backlight unit further comprises a light guide panel disposed between the light source and the photoluminescent layered composite, and
wherein the photoluminescent layered composite is disposed on a surface of the metal oxide layer which faces the light guide panel.

23. The backlight unit of claim 16, wherein the metal oxide layer is a particle layer formed of the plurality of conductive metal oxide particles.

\* \* \* \* \*